UNITED STATES PATENT OFFICE.

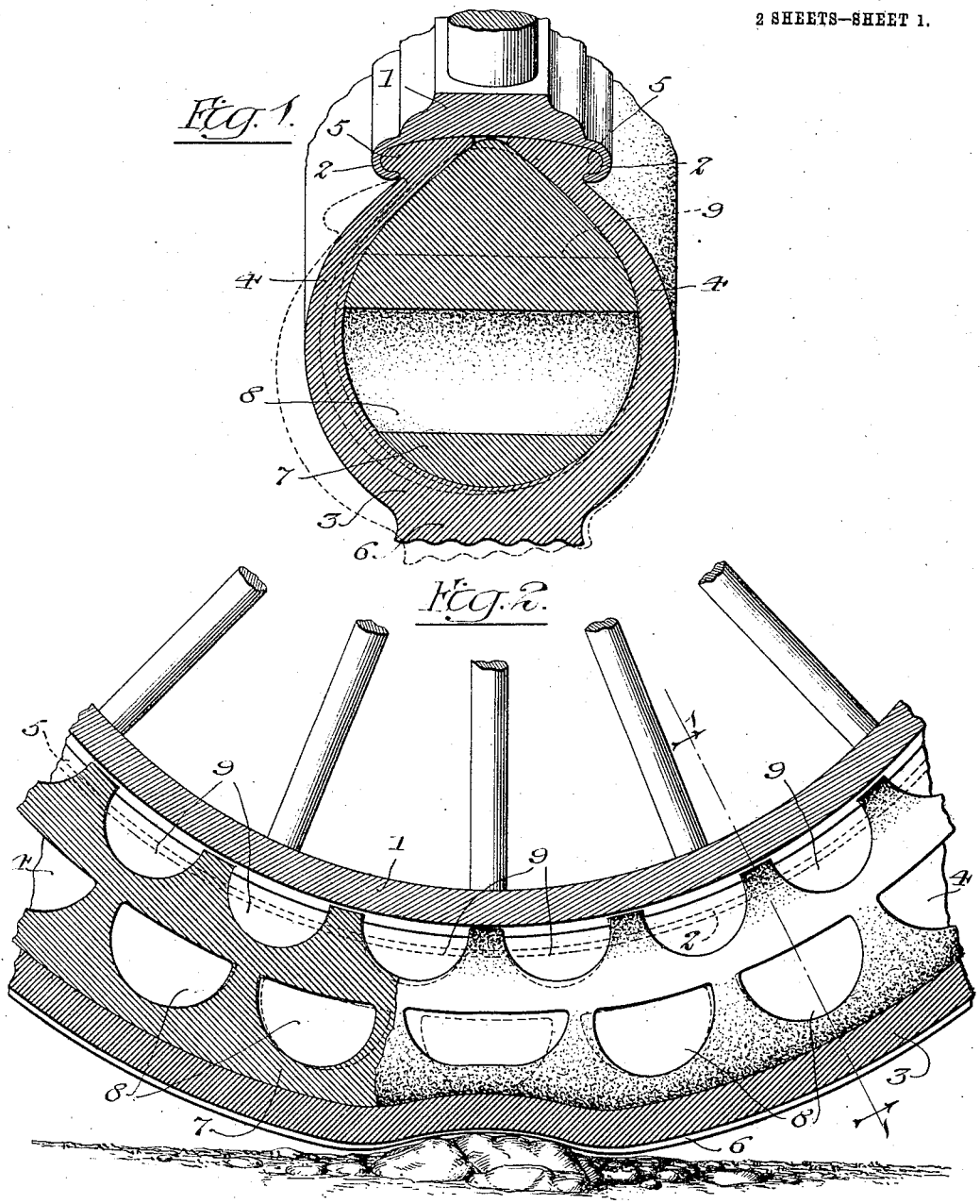

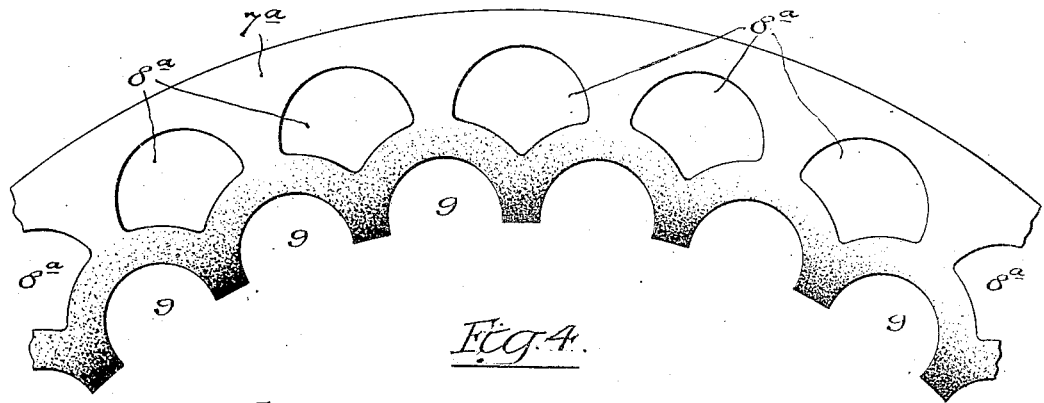
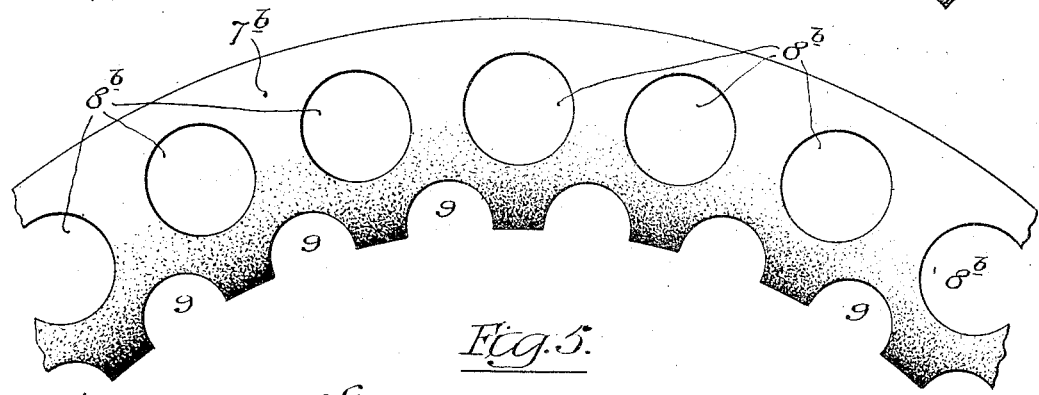
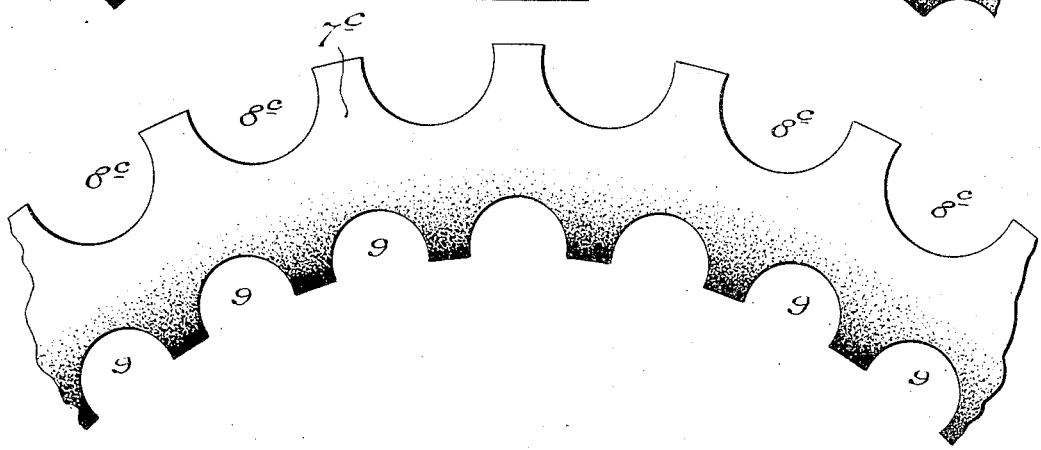

HENRY WELLSTEAD, OF EVANSTON, ILLINOIS, ASSIGNOR OF ONE-HALF TO M. PAUL NOYES, OF CHICAGO, ILLINOIS.

RESILIENT TIRE.

1,087,474.  Specification of Letters Patent.  Patented Feb. 17, 1914.

Application filed October 24, 1908. Serial No. 459,307.

*To all whom it may concern:*

Be it known that I, HENRY WELLSTEAD, a citizen of the United States, and a resident of the city of Evanston, county of Cook, and State of Illinois, have invented certain new and useful Improvements in Resilient Tires, of which the following is a specification.

The invention relates to resilient cushion tires for vehicle wheels, and seeks to provide a simple and effective construction of that type in which a filler of relatively soft, resilient rubber or rubber composition is removably arranged within and protected by a tire casing of tough, flexible material, and the invention consists in the features of improvement hereinafter set forth, illustrated in the accompanying drawings and more particularly pointed out in the appended claim.

Tires comprising casings and resilient rubber fillers have heretofore been employed, and such fillers have been of cellular construction in order to reduce the weight of the tire. But, for the most part, the cells or openings have extended longitudinally through the tire and pressure on the tire is transmitted laterally so that it is unduly flattened. In other cases, the filler is made of sections or enlarged portions spaced apart circumferentially around the tire, so that the tire is of different stiffness at different points.

In accordance with the present invention, the filler of resilient rubber or rubber compound extends throughout the tire casing and is preferably a continuous, endless or annular strip with rows of transverse openings that are so staggered and arranged that the resilience and stiffness of the tire is substantially the same at all points, and pressure upon the tire is transmitted in circumferential direction. The body of the filler about the transverse openings forms a connected series of superposed staggered arches, which effectively distributes the strain circumferential of the tire so that no small section at any given time is required to withstand all the pressure on the tire. The tire casing is open along its inner periphery and is preferably of the so-called clencher type, the side portions of which are provided with flanges for detachably engaging the hook flanges of the wheel rim so that the resilient filler may be readily removed or inserted within the casing, and so that the filler may be substituted for or used interchangeably with the inner tube of pneumatic tires of the usual form. The filler, before it is placed in position, is slightly larger in cross section, than the space inclosed by the tire casing when the latter is placed on the wheel rim, so that the filler is compressed when placed in position and the ends of the transverse cells or openings are effectively closed by the walls of the casing to prevent the escape of air therefrom. The air thus entrapped and compressed within the cells increases the resilience of the tire moreover, the pressure of the compressed filler against the casing aids in holding the latter in position on the wheel rim.

In the drawings: Figure 1 is a cross section of the wheel rim and improved tire taken on the line 1—1 of Fig. 2. Fig. 2 is a partial, longitudinal section with a portion of the filler shown in elevation. Figs. 3, 4 and 5 are partial views in elevation of different modified forms of the filler.

The wheel rim 1 is of the usual clencher type and is provided with annular hook flanges 2 at its edges. The tire casing 3 is of the usual clencher type, is open along its inner periphery, and its separate side portions 4 are provided near their edges with laterally projecting flanges 5 which detachably interlock with the hook flanges 2 of the wheel rim. To resist wear, the casing is formed of tough, flexible material such as rubber with layers or plies of canvas, vulcanized therein. The tire case may be provided with any suitable form of tread 6.

The filler strip 7 is formed of relatively soft, resilient or elastic rubber or rubber compound and extends through all portions of the tire casing and, as stated, it is preferably vulcanized in an annular mold and is endless. It is provided with a number of rows of transverse openings extending from side to side thereof. The form shown has two rows 8 and 9 of transverse openings which are staggered or alternately arranged and, because of the annular form of the filler and to have the walls about the openings of substantially the same thickness, the inner row of openings 9 are smaller than the outer row of openings 8.

In placing the tire upon the rim, the filler is inclosed within the casing and the latter is forced by suitable tools into place with its flanges 5 engaging the hook flanges 2 of the wheel rim. When unconfined, the filler 7 is larger in cross section than the space within the casing when the latter is in position on the wheel, so that, in forcing the casing into place, the filler will be compressed and the inner face of the casing brought to bear snugly upon all portions of the outer surface of the filler. The ends of the openings or cells 8 and 9 will also be effectively closed and the air thus entrapped and compressed in the cells will increase the resilience of the tire. Moreover, the compressed filler or core tends to expand and thereby press against the side portions 4 of the tire casing to firmly interlock the flanges 5 of the tire casing with the hook flanges 2 of the wheel rim.

Preferably, the outer transverse openings or cells are formed near the central portion of the filler as shown in Figs. 1, 2, 3 and 4, so that the outer part of the filler fits against all portions of the tread of the tire casing, while the inner row of cells are formed at the inner portion of the filler and are open at its inner periphery. The outer row of cells may open upon the outer periphery of the filler as shown at 8$^c$ in Fig. 5, but the arrangement shown in the other figures is preferred.

Except for the transverse cells or openings, the body of the filler is solid and is uniformly compressed and compactly fills all the space within the tire casing. The staggered arrangement of the transverse openings is such that the cross sectional area of the filler is substantially the same throughout and the resilience and stiffness of the tire is substantially the same at all points. The body of the filler about the openings constitutes two or more (two in the form shown) connected series of superposed, staggered arches, the walls of which extend transversely of the tire. By this arrangement, pressure on the tire is transmitted from one arch to the other in circumferential direction and no small portion of the tire is required to bear all the strain at any given moment. Unlike the ordinary pneumatic tire, the improved tire will not puncture or blow out.

The shape of the walls of the arches and of the openings 8 and 9 may vary from that shown in Fig. 1. In the form shown in Fig. 3, the outer row of transverse openings 8$^a$ are kite-shaped and, in the form shown in Fig. 4, the outer row are circular in section. The rows of staggered, transverse openings could be otherwise shaped without departure from the essentials of the invention, but the outer walls of the cells are preferably cylindrical as shown in Figs. 2, 3 and 4, and the form of the openings 8 and 9 of Figs. 1 and 2, which are semi-circular in cross section, is thought to be the most desirable.

It is obvious that changes could be made in the details set forth without departure from the essentials of the invention.

I claim as my invention:—

The combination with a clencher wheel rim and a tough, flexible tire casing having flanged side portions detachably engaging the hook flanges of said rim, of a core of soft, resilient rubber arranged within said casing and having an outer part fitting all portions of the inner face of the tread of the casing and a flat, inner part resting upon said rim between the side portions of said casing, said casing having a number of rows of staggered, transverse air cells extending through the core from side to side thereof and forming rows of superposed, staggered arches with the walls of the inner row resting upon the wheel rim, said arches being arranged to transmit pressure on the tire in circumferential direction, said core being larger in cross-section, when unconfined, than the space within said casing and the cross-sectional area of said core being substantially uniform throughout all portions thereof, said casing being arranged to close the ends of said transverse openings and entrap and compress the air in said openings and uniformly compress said core, substantially as described.

HENRY WELLSTEAD.

Witnesses:
Harry L. Clapp,
Katharine Gerlach.